(12) United States Patent
DiPlacido

(10) Patent No.: US 6,226,292 B1
(45) Date of Patent: May 1, 2001

(54) FRAME REPLICATION IN A NETWORK SWITCH FOR MULTI-PORT FRAME FORWARDING

(75) Inventor: Bruno DiPlacido, Dedham, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/044,285

(22) Filed: Mar. 19, 1998

(51) Int. Cl.[7] ................................................. H04L 12/28
(52) U.S. Cl. ............................................. 370/395; 370/428
(58) Field of Search ..................................... 370/428, 395, 370/375, 445, 401, 463–465, 315, 412, 413; 709/249, 237, 250; 714/748

(56) References Cited

U.S. PATENT DOCUMENTS 5,724,351 * 3/1998 Chao et al. ........................... 370/395
5,802,052 * 9/1998 Venkataraman ...................... 370/395

* cited by examiner

Primary Examiner—Wellington Chin
Assistant Examiner—Prenell Jones
(74) Attorney, Agent, or Firm—Weingarten, Schurgin, Gagnebin & Hayes LLP

(57) ABSTRACT

A network data switch includes a transmit buffer memory containing transmit buffers allocated to temporarily store data frames being transmitted on attached network links. Multicast frames are replicated into different transmit buffers as necessary for transmission on the corresponding network links. Multiple-cycle write and read phases of the transmit buffer memory are defined, and the transmit buffer memory is operated in different modes for unicast and multicast operation. For a unicast frame, multi-word segments of the frame are written into the correct transmit buffer during successive write phases. Each segment is written during a write phase as a burst of data words at a high data rate. For a multicast frame, words of the frame are written in a time-slice manner into the transmit buffers for the network links on which the frame is to be transmitted. The words are written during successive write phases. During each write phase a single word is written to all the necessary transmit buffers by being supplied to the buffer memory data input while the buffers are sequentially addressed.

7 Claims, 14 Drawing Sheets

| | (63:56) | (55:48) | (47:40) | (39:32) | (31:24) | (23:16) | (15:8) | (7:0) |
|---|---|---|---|---|---|---|---|---|
| Word 0 | High Descriptor (31:0) | | | | Low Descriptor (31:0) | | | |
| Word 1 | VID (15:8) | High Descriptor (55:32) | | | VID (7:0) | Low Descriptor (55:32) | | |
| Word 2 | Byte 0 | Byte 1 | Byte 2 | Byte 3 | Byte 4 | Byte 5 | Byte 6 | Byte 7 |
| ⋮ | ⋮ | | | | ⋮ | | | |
| Word n | B 8(n-2) | | | | | | | |

| High Descriptor | | | | | |
|---|---|---|---|---|---|
| (55:16) | (15:14) | (13) | (12) | (11) | (10:0) |
| Port Vector | Flag Code | VLAN Encap | Internal | Source Port (5) | Frame Length |

| Low Descriptor | | |
|---|---|---|
| (55:16) | (15:11) | (10:0) |
| Port Vector | Source Port (4:0) | Frame Length |

FRAME REPLICATION IN A NETWORK SWITCH FOR MULTI-PORT FRAME FORWARDING

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The invention is related to the field of data networks, and more particularly to the replication of multicast frames in a computer network switch.

Network switches generally include input and output ports to which network links are attached, a switching fabric for selectively forwarding data frames received at an input port to an output port, and data buffers used to compensate for different data rates at various points within the switch. In one configuration receive buffers are placed between the input ports and the fabric, and transmit buffers are placed between the fabric and the output ports. Among other functions, the buffers compensate for differences between the high instantaneous data bandwidth of the fabric and the relatively low instantaneous bandwidth of the ports.

Many network switches are capable of forwarding "unicast" and "multicast" frames. A unicast frame is a frame which is forwarded to a single destination address. A multicast frame, in contrast, is forwarded to two or more destinations.

Multicast operation can cause the slowdown of data traffic in the switch, because a single receive port temporarily monopolizes two or more transmit ports, making them unavailable to transmit frames received by other receive ports. The receive and transmit buffers enable the switch to receive additional frames when multicast frames are being serviced. These received frames can then be transmitted when the desired transmit ports become available. However, the accessibility of these buffers, especially the transmit buffers, diminishes as a multicast frame is replicated to all the required ports. It is therefore desirable that the rate at which data is transmitted from the fabric into the transmit buffers be reducible to accommodate multicast operation. One of the challenges in the design of switch data paths is to achieve generally high data transfer rates across the fabric, while enabling the data transfer rate to be reduced as needed to accommodate multicast operation.

One known technique for achieving these goals is to interpose a buffer large enough to hold a maximum-size frame between the fabric and the transmit buffers. This intermediate buffer is used to accumulate an entire frame from the fabric at the maximum data rate. The frame stored in this buffer is then written to the transmit buffers as required. In the case of a unicast frame the frame is written to a single transmit buffer. In the case of a multicast frame the frame is written to a transmit buffer associated with each port through which the frame is to be forwarded. No data is transferred from the fabric until the transmit buffers have written. When writing is complete, data is again allowed to flow from the fabric, and the buffer is freed for use by subsequent frames.

The above approach suffers from two drawbacks. One drawback is the large size of the intermediate buffer. The buffer must be able to hold a maximum-size frame, which can be, for example, approximately 1.5 kilobytes (KB) in a Fast Ethernet network. Such a large buffer can consume substantial area within integrated circuits that are used to implement part or all of the data path on the transmit side of the fabric. Another drawback is the delay incurred in filling and emptying the intermediate buffer. It would therefore be desirable to provide an interface between the fabric and the transmit buffers that enables high speed data transfer and that supports both unicast and multicast operation while avoiding the aforementioned problems.

BRIEF SUMMARY OF THE INVENTION

In accordance with the present invention, a network switch is disclosed in which transmit buffers are used to temporarily store data frames being transmitted, and multicast frames are replicated and stored in multiple transmit buffers for transmission on corresponding network links. A memory containing the transmit buffers is operated in different modes for unicast and multicast frames. A single overall timing format is used in both modes, while the sequences of addresses and data supplied to the buffer memory are different in the two modes. No large frame-sized buffer is required in the transmit data path. Integrated circuit die area and frame transmission delays are therefore minimized.

In the presently disclosed switch, write and read phases for the transmit buffer memory are defined. The write and the read phases both last several cycles, so that several word locations in the memory are written to or read from the memory during the respective phase. When a unicast frame is being transferred from the fabric to the transmit buffer memory, multi-word segments of the frame are written into one of the transmit buffers during successive write phases, each segment being written during a write phase at a high data rate. The rate is preferably high enough to enable the transmit buffer memory to absorb streams of unicast frames from twelve receive ports substantially indefinitely, so that the overall operating data rate of the network links is maximized.

Multicast frames are selectively written in a time-sliced manner into specified ones of the transmit buffers. Words of the multicast frame are written into multiple transmit buffers during successive write phases, each word being written to all the necessary transmit buffers in a given write phase by supplying the data word to the memory data input and sequentially addressing the buffers. Preferably the buffers are selected during each write phase at the same rate at which the words of a frame segment are written during unicast operation. If the rates are the same, and if the segment size in words is equal to the number of transmit buffers, then the overall timing of the write phase in each case is the same. Accordingly, control of the writes to the transmit buffer is simplified. During frame replication the data rate from the fabric is reduced to substantially one word per write phase, so that only minimal buffering is required in the transmit data path.

Other aspects, features, and advantages of the present invention are disclosed in the detailed description which follows.

BRIEF DESCRIPTION OF THE SEVERAL VIEWS OF THE DRAWING

The invention is more fully understood by reference to the following Detailed Description in conjunction with the Drawing of which.

DETAILED DESCRIPTION OF THE INVENTION

Figure 1:
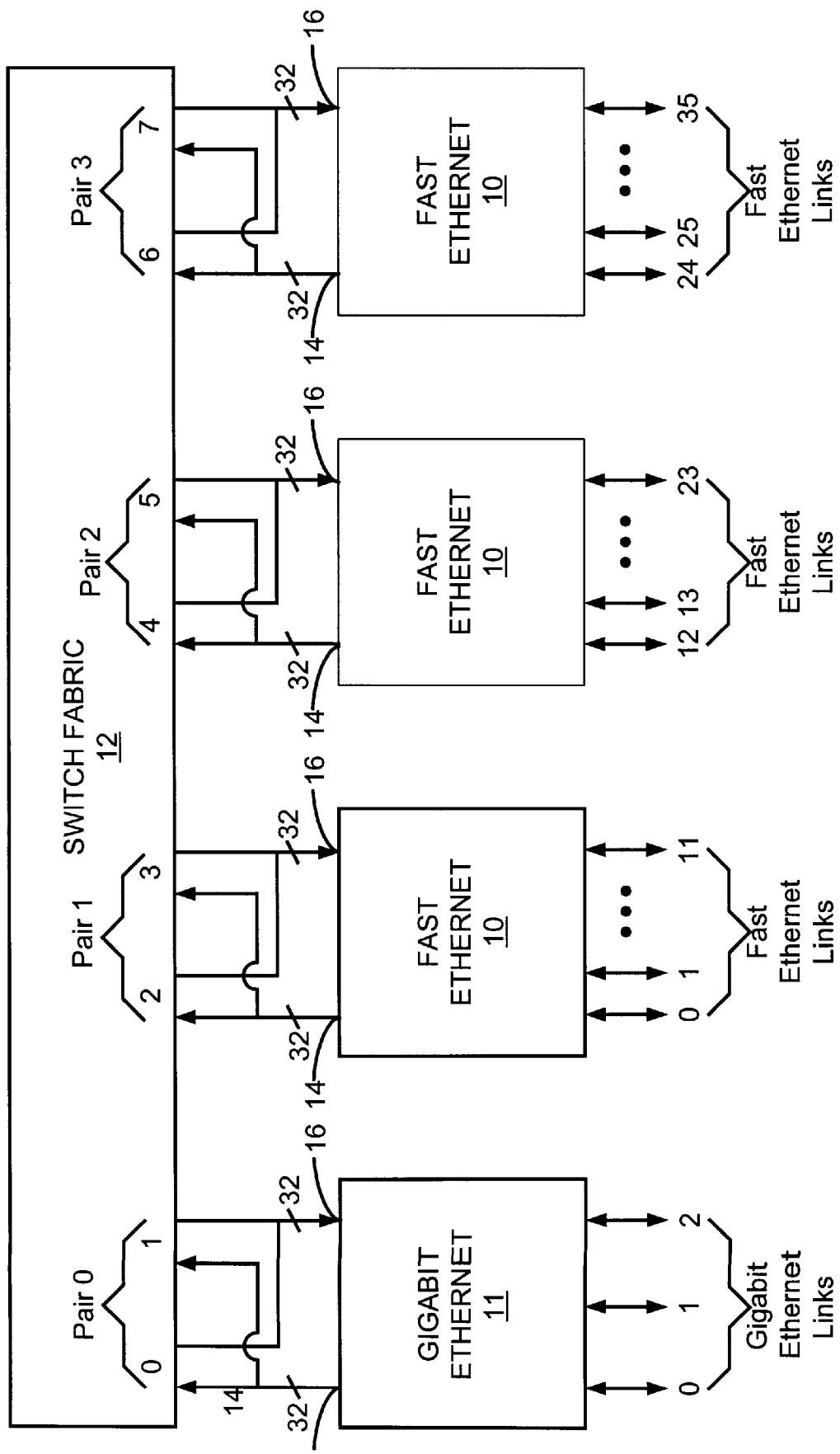
FIG. 1 is a block diagram of a network switch including three Gigabit Ethernet ports and 36 Fast Ethernet ports.

FIG. 1 depicts a network switch. The switch includes three 12-port Fast Ethernet network interfaces 10, each one connected to twelve Fast Ethernet communications links. The switch also includes one 3-port Gigabit Ethernet interface 11 connected to three Gigabit Ethernet communications links. The network interfaces 10, 11 are connected to a switching fabric 12 via eight fabric ports labelled 0 through 7 in FIG. 1. Each fabric port includes a 16-bit input and a 16-bit output.

The switch fabric 12 includes a crossbar switch for selectively forwarding frames from each network link to one or more of the other network links. Internally, the fabric 12 can simultaneously transfer data from each of eight 16-bit inputs to one or more of eight 16-bit outputs. However, as shown in FIG. 1, pairs of 16-bit ports are combined into 32-bit ports to communicate with each network interface 10, 11. These pairs are labelled Pair 0, Pair 1, Pair 2 and Pair 3 in FIG. 1. The ports in each pair operate together to transfer 32-bit words between a 32-bit output 14 of one of the four network interfaces 10, 11 and a 32-bit input 16 of one or more of the other network interfaces 10, 11.

The maximum data rate at an output 14 and an input 16 is 400 megabytes per second (MB/s), which corresponds to one 32-bit word every 10 nanoseconds. This data rate enables each of the 12 Fast Ethernet links connected to the ports of a given Fast Ethernet interface 10 to run at its full 12.5 MB/s data rate during unicast operation. This data rate also enables the three Gigabit Ethernet links connected to the ports of the Gigabit Ethernet interface 11 to run at their full 125 MB/s data rate during unicast operation.

Figure 2:
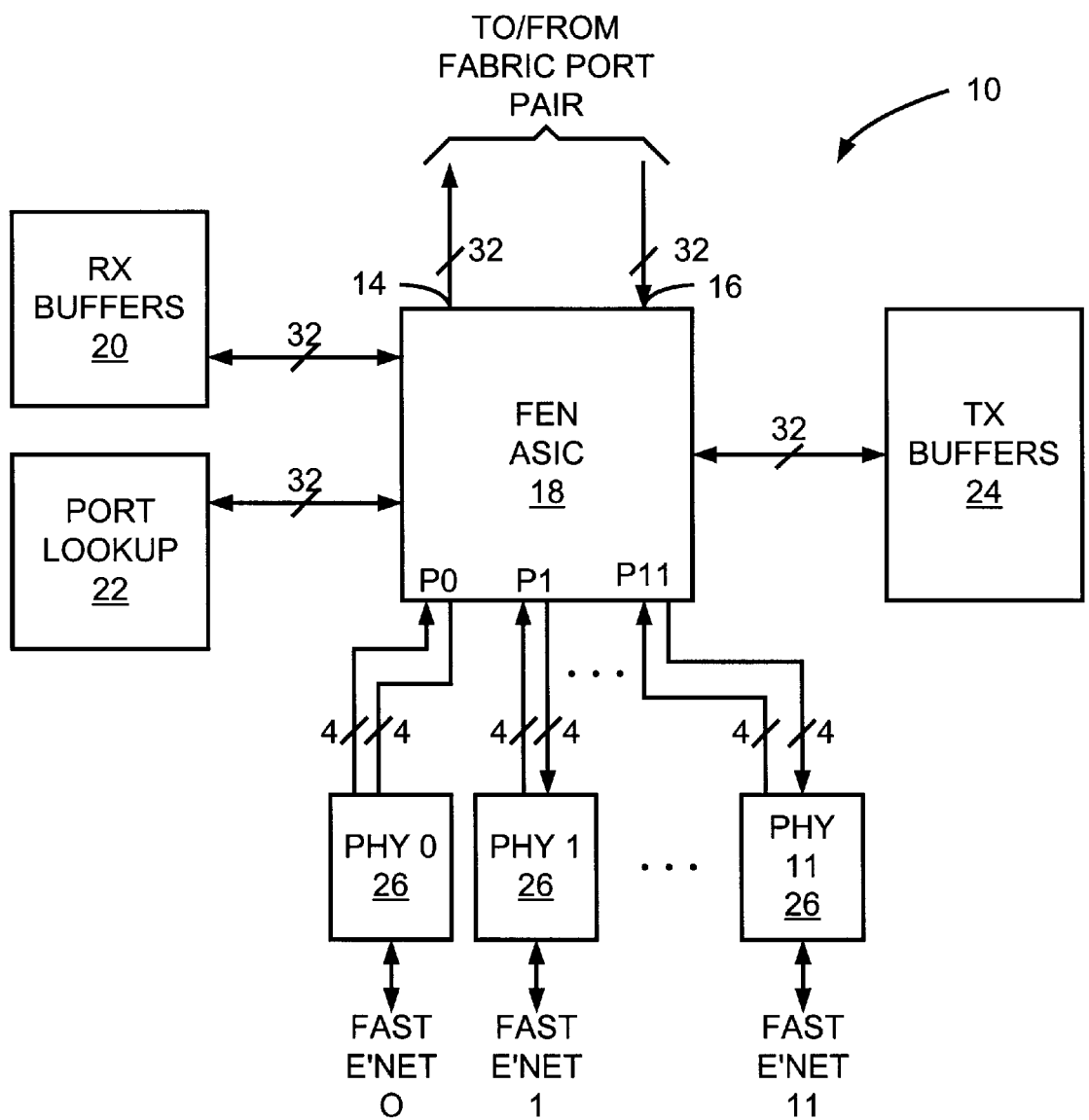
FIG. 2 is a block diagram of a portion of a 12-port Fast Ethernet interface in the switch of FIG. 1.

FIG. 2 shows a Fast Ethernet interface 10 in greater detail. Each interface 10 includes a Fast Ethernet (FEN) application specific integrated circuit (ASIC) 18, a receive (RX) buffer memory 20, an port lookup (LU) memory 22, a transmit (TX) buffer memory 24, and physical (PHY) interfaces 26 that implement the physical layer of the Fast Ethernet network protocol. As shown, the FEN 18 has 32-bit data interfaces to the memories 20, 22 and 24, and also has twelve network port interfaces P0 through P11, each having a 4-bit parallel input and a 4-bit parallel output connected to the corresponding PHY interface 26. Receive buffers in the RX memory 20 provide temporary storage for frames received from the attached network links. The frames are forwarded from the RX memory 20 through the fabric 12 for forwarding out of selected ones of the output ports. Transmit buffers in the TX memory 24 provide temporary storage for frames received from the fabric 12 before transmission from the respective output port over the associated network link. The port lookup memory 22 is used to facilitate the mapping of destination addresses to one or more ports of the switch, so that received frames can be correctly forwarded to interfaces 10 and selected ports Px.

Figure 3:
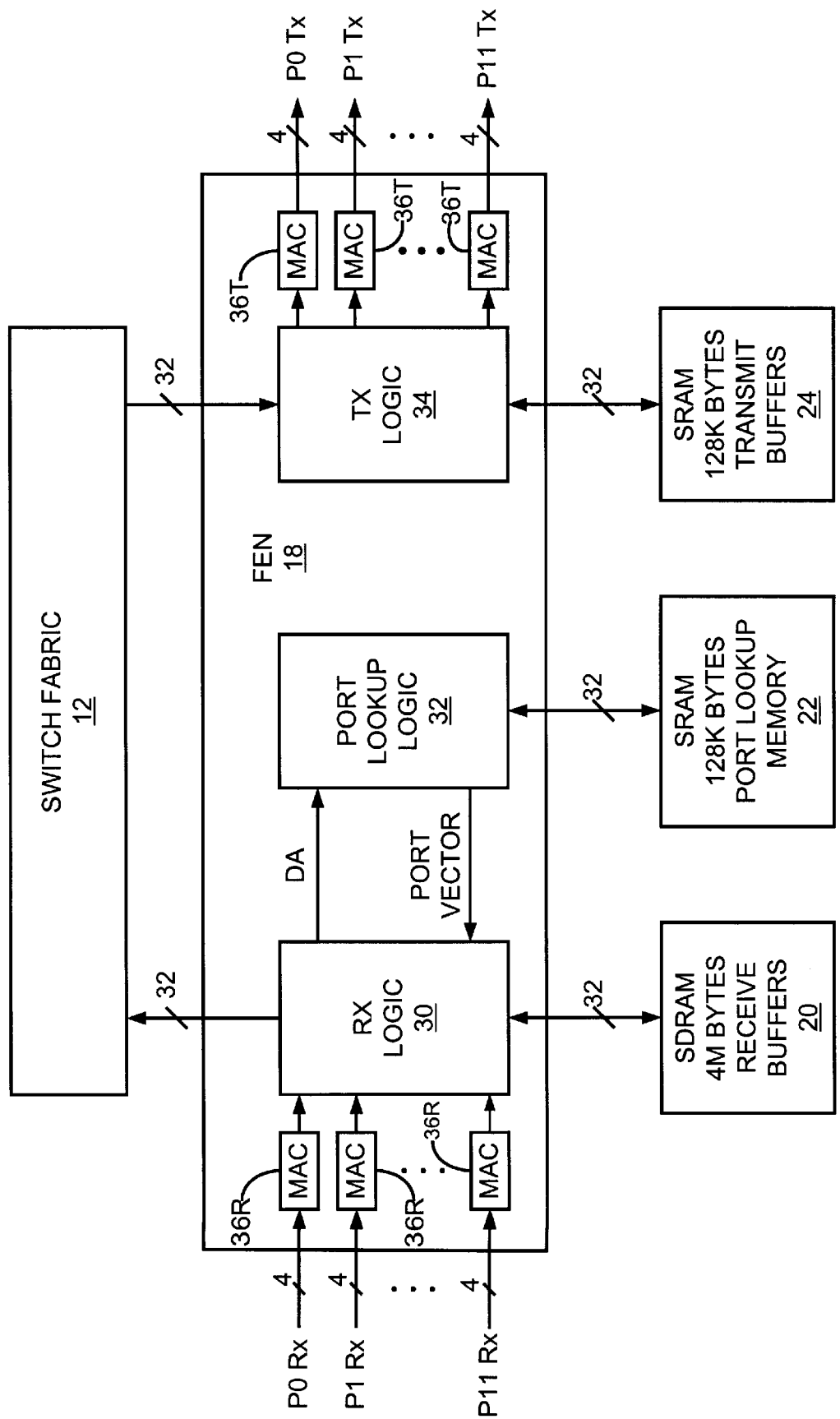
FIG. 3 is a block diagram of a Fast Ethernet application-specific integrated circuit (ASIC) in the Fast Ethernet interface of FIG. 2.

FIG. 3 shows a FEN ASIC 18 in greater detail. The FEN ASIC 18 includes receive (RX) logic 30, port lookup logic 32, transmit (TX) logic 34, and media-access controllers (MACs) 36. For clarity, only the data portions of the interfaces to the memories 20, 22, and 24 are shown. As is described in greater detail below, the FEN ASIC 18 also generates the addresses for these memories and supplies the generated addresses to the memories.

The MACs 36 provide media access control functions as is known in the art. More specifically, the MACs 36 include a 32-bit parallel interface for receiving data from the associated transmit logic 34, and a 32-bit interface for forwarding data to associated receive logic 30 within the FEN ASIC 18. Each MAC 36 includes a parallel output for forwarding data from the MAC to the associated PHY and a parallel input for receiving data from the associated PHY. Though illustrated separately in FIG. 2 for clarity, each MAC 36 comprises both a receive portion 36R, a transmit portion 36T and control circuitry (not shown) necessary to implement the MAC protocol.

The RX logic 30 provides data paths and control signals to transfer received frames from the MACs 36 to corresponding receive buffers within the RX buffer memory 20. It also transfers frames from the receive buffers 20 to the switch fabric 12 for forwarding to transmit logic 34 in one or more of the interfaces 10, 11. The RX logic 30 provides the destination address (DA) of received frames to the port lookup logic 32, which uses the DA to index into a lookup table in the port lookup memory 22 to obtain a Port Vector. The Port Vector is a 40-bit quantity indicating which of the switch ports the frame is to be forwarded to. The frame forwarded by the RX logic 30 includes a descriptor including the Port Vector provided by the port lookup logic 32. The format of the descriptor and the Port Vector are described in greater detail below.

The TX logic 34 is responsible for transferring frames from the switch fabric 12 to the correct MAC or MACs 36 for transmission over the respective network links. Frames are temporarily stored in the TX buffer memory 24 prior to being forwarded.

Figure 4:
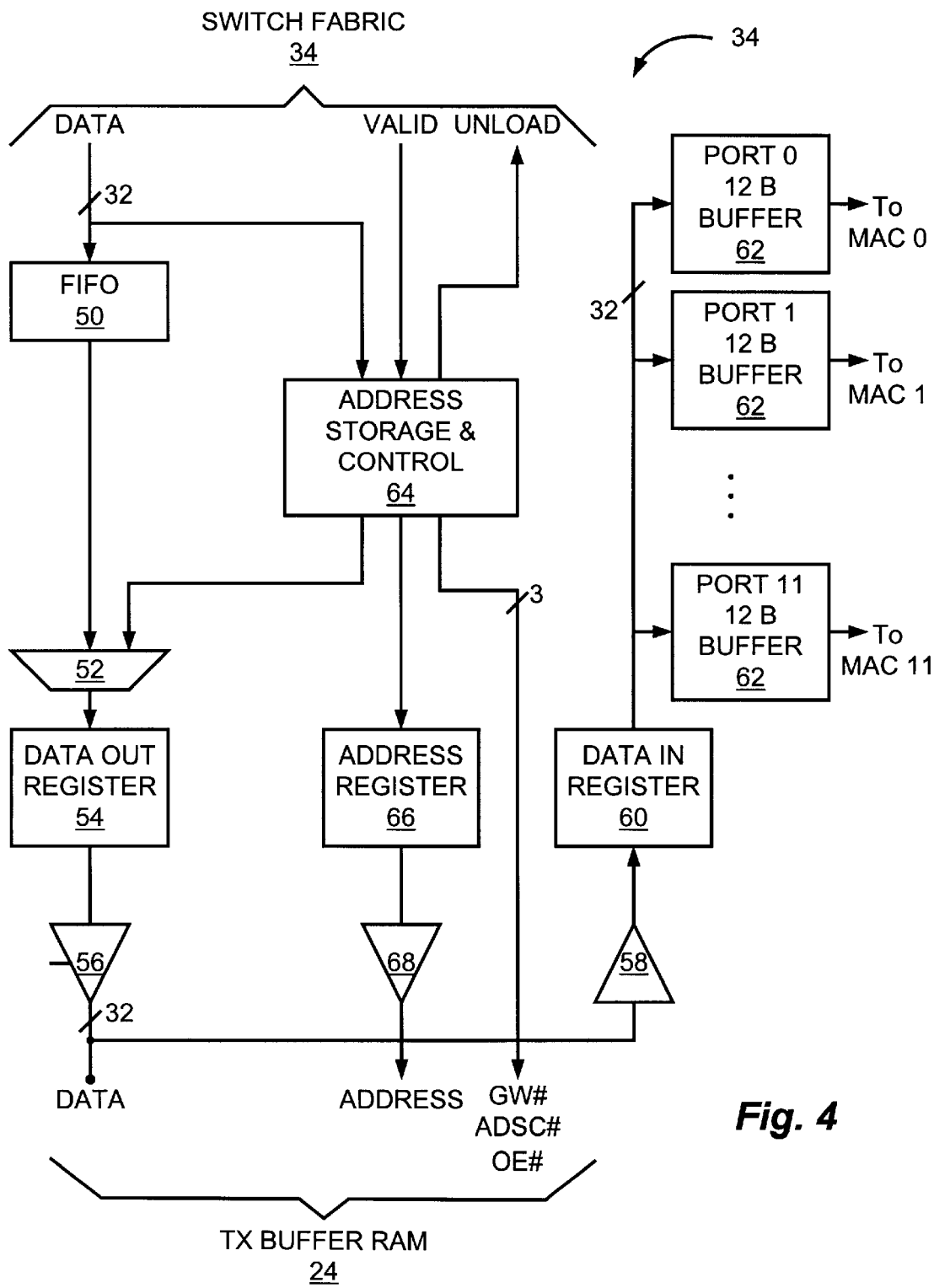
FIG. 4 is a block diagram of transmit logic in the Fast Ethernet ASIC of FIG. 3.

FIG. 4 shows the TX logic 34 in greater detail. The TX logic 34 includes a 128-byte first-in first-out (FIFO) buffer 50, a multiplexer 52, a data output register 54, and a tristate output driver 56. The data path from the buffer memory 24 to the MACs 36 of FIG. 2 includes a driver 58, a data input register 60, and twelve 12-byte MAC buffers 62. One MAC buffer 62 is provided per port.

Address storage and control logic 64 generates addresses for the buffer memory 24 via an address register 66 and an address driver 68. The logic 64 also controls the operation of the TX logic elements, the interface to the switch fabric 12, and the TX buffer memory 24. Specifically, control signals Valid and Unload are used by the logic 64 to control the flow of data from the switch fabric 12. The logic 64 also generates control signals GW# (Global Write) ADSC# (Address Control), and OE# (Output Enable) used to control the operation of the SRAM transmit buffer memory 24. The operations involving these signals are described below.

Figure 5:
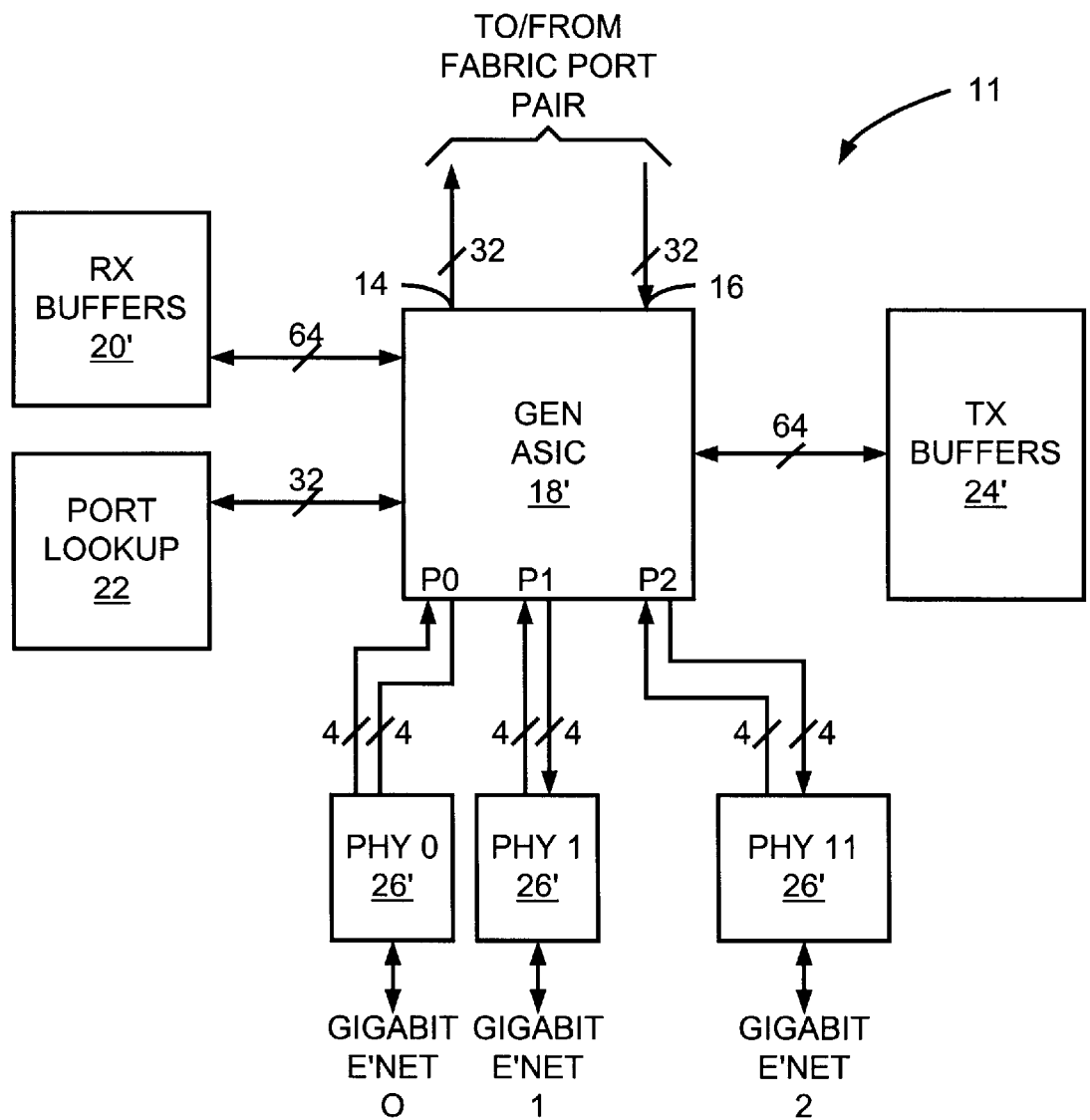
FIG. 5 is a block diagram of a portion of a three-port Gigabit Ethernet interface in the switch of FIG. 1.
Figure 6:
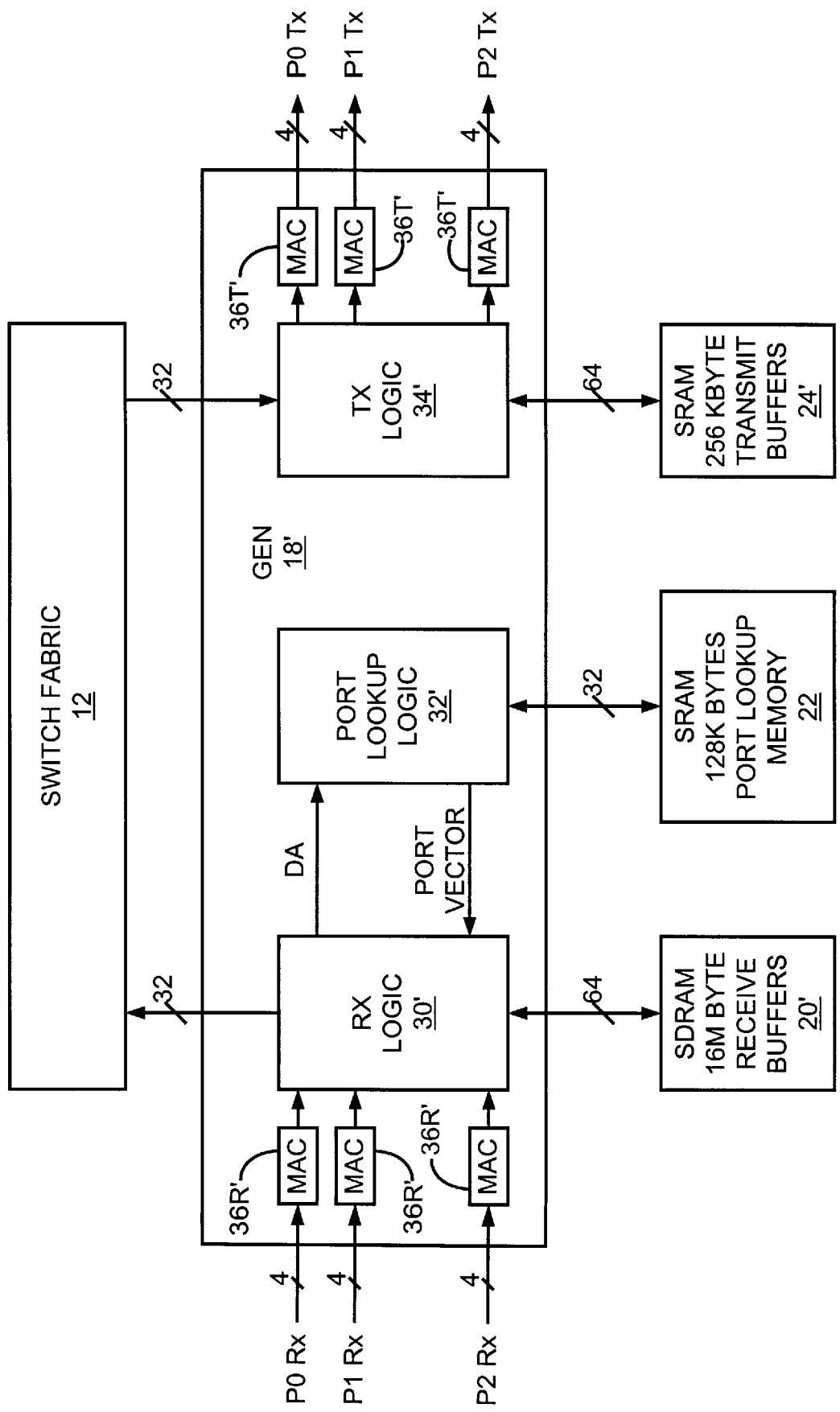
FIG. 6 is a block diagram of a Gigabit Ethernet application-specific integrated circuit (ASIC) in the Gigabit Ethernet interface of FIG. 5.
Figure 7:
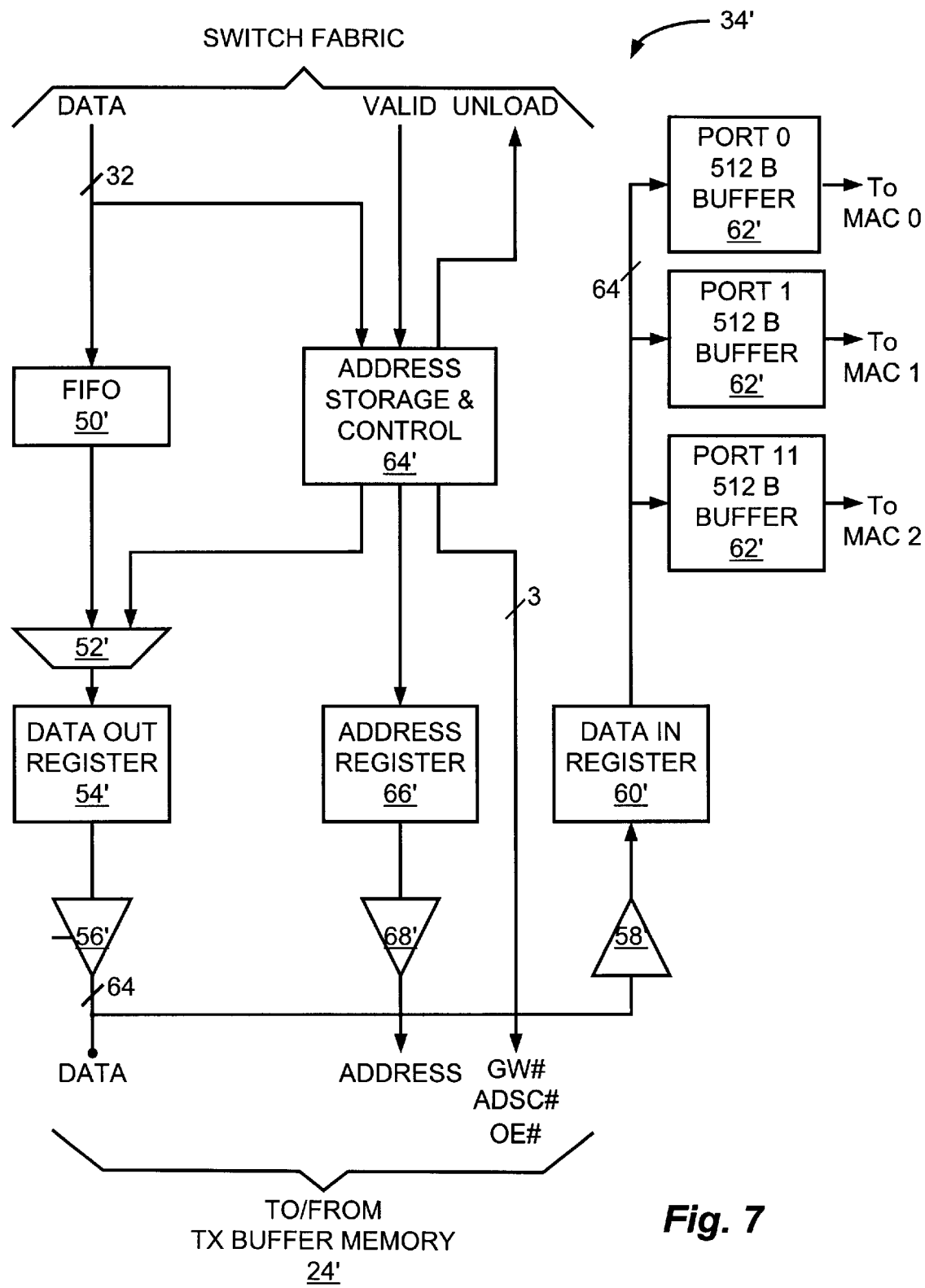
FIG. 7 is a block diagram of transmit logic in the Gigabit Ethernet ASIC of FIG. 6.

FIGS. 5, 6 and 7 show details of the Gigabit Ethernet interface 11 of FIG. 1. The structure of the interface 11 is similar to that of interface 10 with some exceptions. The Gigabit Ethernet interface 11 has three 125 MB/s Gigabit Ethernet ports P0, P1, and P2. A Gigabit Ethernet (GEN) ASIC 18' is employed. The data paths from the GEN ASIC 18' to the receive and transmit buffer memories 20' and 24' are 64 bits wide, as is the data path between the TX logic 34' and the MACs 36'. These wider data paths provide the high data rate required to support the three Gigabit Ethernet ports. The FIFO buffer 50' and each MAC buffer 62' have 512 bytes of storage. Other differences are noted below in the section where operation of the interfaces 10 and 11 is described.

Figure 8:
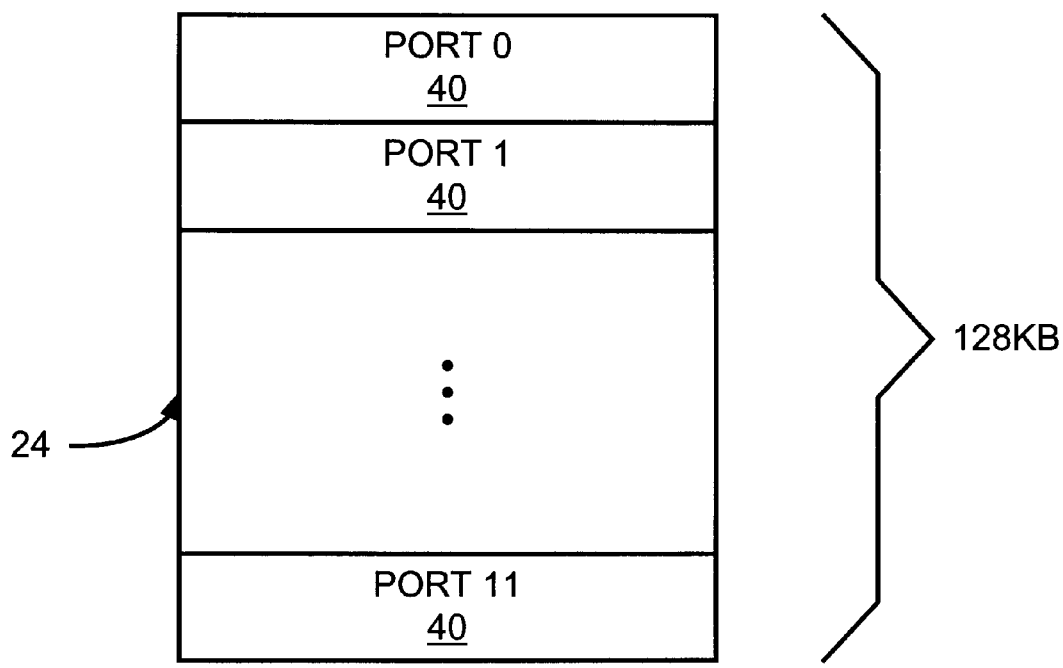
FIG. 8 is a diagram showing transmit buffers residing in a transmit buffer memory in the Fast Ethernet interface of FIG. 2.

FIG. 8 shows the structure of the transmit buffer memory 24 employed in the Fast Ethernet interfaces 10. The memory 24 is a 128 KB static random-access memory (SRAM) containing 12 equal-sized areas 40, each used to temporarily store frames prior to forwarding on a corresponding port Px. The buffers 40 within the memory 24 are approximately 10.7 KB in size. When a frame arrives at the TX logic 34, it is written into one or more of the port buffers 40 depending on the value of the Port Vector associated with the frame. The frames are forwarded from the port buffer 40 to the respective link under the control of the associated MAC 36. The method by which frames are stored into the port buffers 40 and read from the port buffers 40 is described below.

Figure 9:
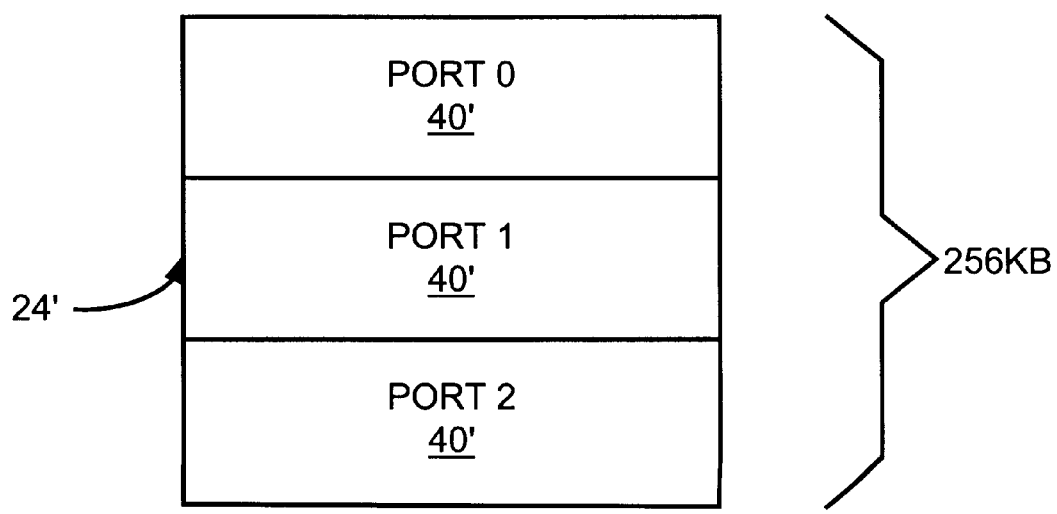
FIG. 9 is a diagram showing transmit buffers residing in a transmit buffer memory in the Gigabit Ethernet interface of FIG. 5.

FIG. 9 shows the structure of the transmit buffer memory 24' employed in the Gigabit Ethernet interfaces 11. The memory 24' has 256 KB of storage, and includes three port buffers 40'. Thus each buffer 40' is approximately 64 KB in size.

Figures 10, 11, 12, 13:
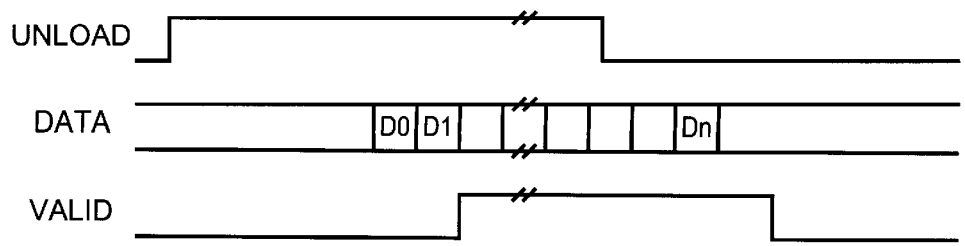
FIG. 10 is a diagram showing the structure of a frame within the switch of FIG. 1.
FIG. 11 is a diagram showing the structure of a high-order descriptor in the frame of FIG. 10.
FIG. 12 is a diagram showing the structure of a low-order descriptor in the frame of FIG. 10.
FIG. 13 is a timing diagram showing the timing of data transfers from the switch fabric to a network interface in the switch of FIG. 1.

FIG. 10 shows the structure of a frame as transferred from a FEN 18 or GEN 18' to the switch fabric 12. 8-byte words 0 and 1 of the frame include high and low descriptors. These descriptors are shown in FIGS. 11 and 12. The high and low descriptors both contain the Port Vector and Frame Length. These values are replicated in the two descriptors for reasons described below. Words 2 through n make up the data portion of the frame. The 64-bit wide words shown in FIG. 10 are divided into two 32-bit sub-words. During operation, one of the sub-words is sent in two consecutive cycles to the 16-bit input of one of the pair of fabric ports 10 connected to a FEN 18 or a GEN 18'. During the same two cycles the other sub-word is sent to the 16-bit input of the other fabric port of the pair.

FIG. 13 illustrates the transfer of data words between the switch fabric 12 and the FEN 18. The control logic 64 asserts a signal UNLOAD indicating that the FEN 18 will accept data words. When the switch fabric has a frame to transfer, it responds to the assertion of UNLOAD by initiating transmission of the frame. The first data word appears on the input of the FEN 18 four cycles after the assertion of UNLOAD. To indicate the presence of data, the switch fabric asserts a VALID signal two cycles after data transmission is started.

As shown, the control logic 64 can interrupt the flow of data words by de-asserting the signal UNLOAD. The assertion of the UNLOAD signal by the control logic 64 causes the switch fabric 12 to stop transmitting data words four cycles later, and then to de-assert the signal VALID two cycles after data transmission has stopped. In this manner the control logic 64 manages the flow of data words from the switch fabric 12 into the FIFO 50 and the TX buffer memory 24.

Figure 14:
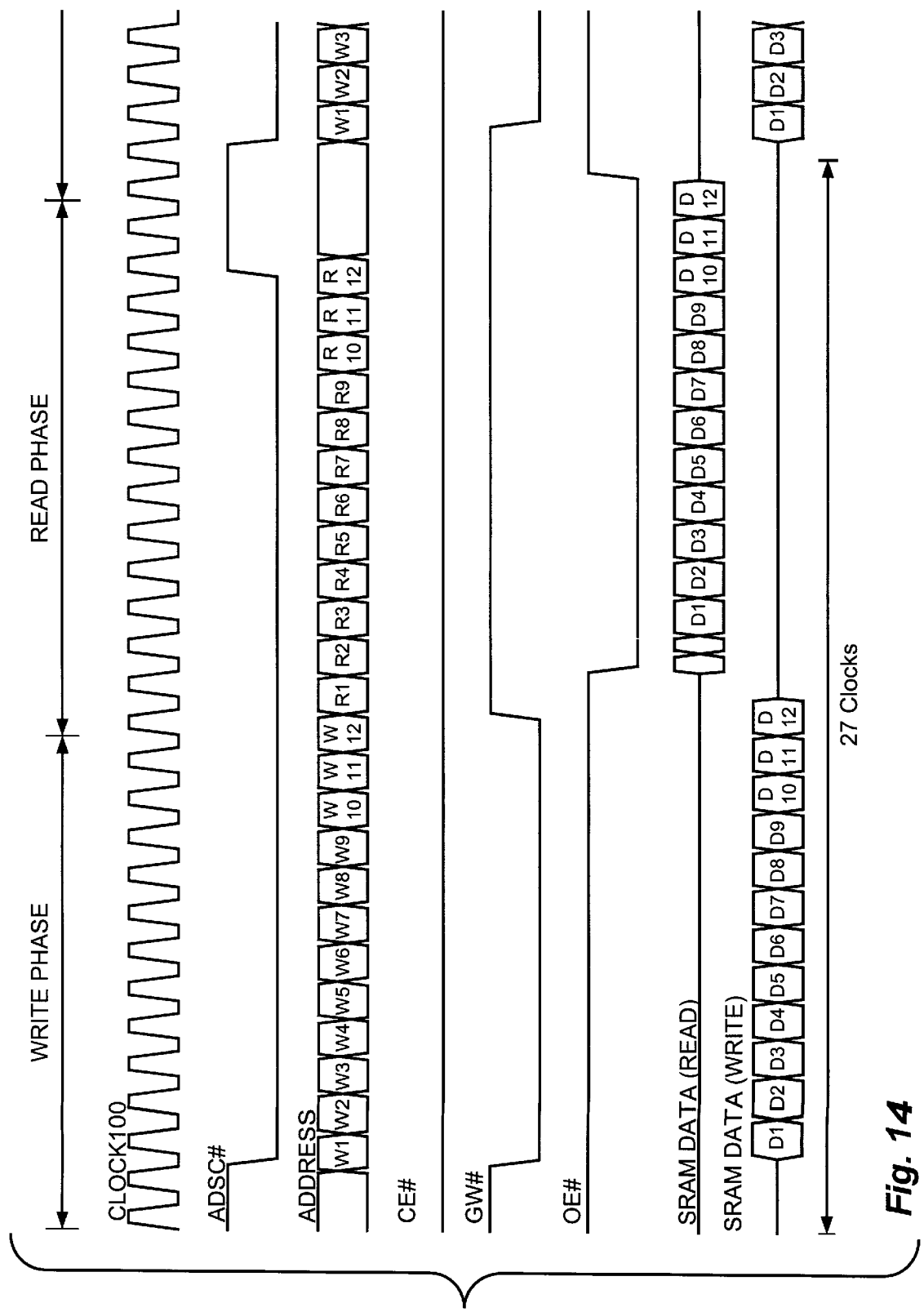
FIG. 14 is a timing diagram showing the timing of transmit buffer memory in the Fast Ethernet interface of FIG. 2 for a frame to be transmitted on only one port of the switch of FIG. 1.

FIG. 14 shows how the FEN ASIC 18 writes data to the TX buffer memory 24 when a Fast Ethernet frame is to be forwarded to only a single port. Access to the buffer memory 24 is divided into separate write and read phases during each of which 12 data words are written to or read from the memory 24. During the write phase, frames are written to one or more selected port buffers 40 of the buffer memory 24. During the read phase, data is transferred from the port buffers 40 to the respective MAC buffers 62. Dead cycles are included between the write and read phases to allow for bidirectional data bus turnaround.

During the write phase of FIG. 14, the address control signal ADSC# is asserted to indicate to the buffer memory 24 that the address is valid. The global write signal GW# is also asserted to indicate that a write operation is in progress. Also, the tristate output driver 56 of FIG. 4 is enabled so that the data output register 54 drives the data bus. Twelve data words are written to twelve sequential locations within a single port buffer 40, namely the port buffer for the port through which the frame is to be forwarded. These twelve words make up a contiguous 12-word segment of the frame being transferred from the switch fabric. If fewer than 12 words of a frame remain to be written, then only the remaining words are written. At the end of the write phase the signal GW# is de-asserted and the driver 56 disabled. The read phase of the buffer memory 24 begins one cycle later. The read phase is described in greater detail below.

The transfer of the entire frame from the switch fabric to the TX buffer memory 24 generally takes several consecutive write phases, although it is possible in the case of the Gigabit Ethernet interface 11 for the transfer to take slightly less than one write phase. This possibility is due to the relatively small minimum packet size of 64 bytes in Gigabit Ethernet. The control logic 64 maintains a pointer for each port indicating the location in the corresponding buffer 40 at which the next write should occur. These pointers are advanced in a manner described below such that the segments of each frame are written contiguously into the corresponding buffers 40 in the memory 24.

The remainder of FIG. 14 shows the read phase of the buffer memory 24. The read phase lasts 12 cycles, during which twelve data words are read, one word from each of the 12 port buffers 40. Each data word is conditionally written into the corresponding MAC buffer 62. One condition for a MAC buffer 62 to be written is that the word from the port buffer 40 is part of a frame to be transmitted, i.e., that the port buffer 40 is not empty. The control logic 64 monitors the fullness of the MAC buffers 62, based on their loading during the read phases and their unloading by the MACs. MAC buffers 62 that are too full to accept a data word during the read phase are simply skipped. The control logic 64 also maintains read pointers for each port buffer 40; each read pointer indicates the location in the corresponding port buffer 40 from which the next data word is to be read. Each of these pointers is advanced by one when a word from the corresponding buffer 40 is loaded into the corresponding MAC buffer 62.

As illustrated in FIG. 14, the FEN 18 transfers a segment of a unicast frame at full data rate, i.e., the data words are written into the TX buffer memory 24 at about the same rate as the data words are received from the switch fabric. This case contrasts with the writing of multicast and broadcast frames, described below.

Figure 15:
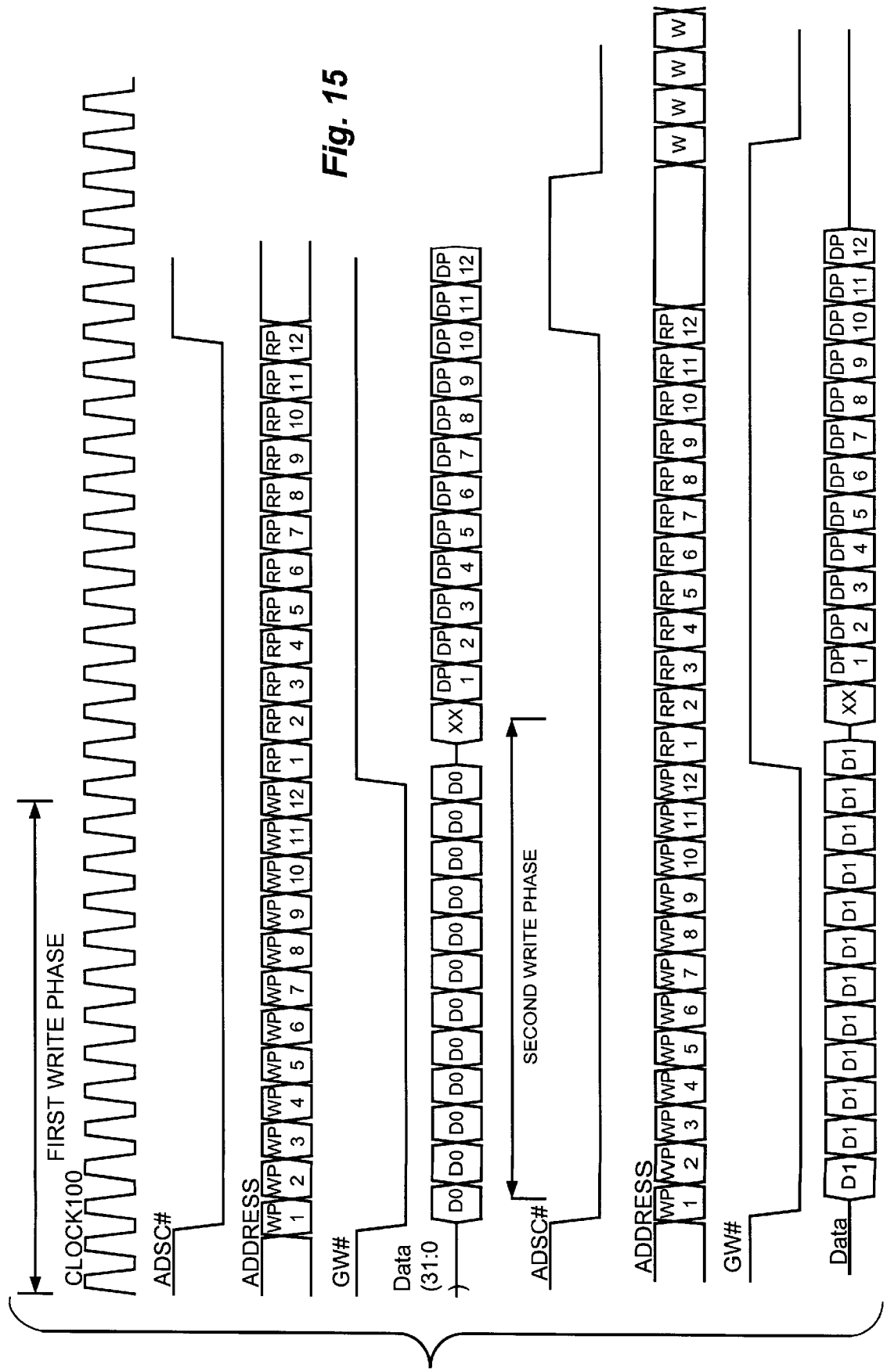
FIG. 15 is a timing diagram showing the timing of transmit buffer memory in the Fast Ethernet interface of FIG. 2 for a frame to be transmitted on multiple ports of the switch of FIG. 1.

FIG. 15 shows how frame data is written into the TX buffer memory 24 by the FEN 18 when the frame is to be forwarded to multiple ports. The write phase again lasts twelve cycles. In the case of a multicast frame a single data word is written to two or more of the port buffers 40, as specified by the Port Vector. The writing takes place as follows. Each port buffer 40 is written at the position indicated by a corresponding write pointer. The write is valid for only those ports indicated by the Port Vector. The logic 64 therefore increments the write pointers for only the port buffers 40 that were validly written, i.e., those associated with ports on which the frame is to be forwarded. The remaining pointers continue to point to the same locations in their respective port buffers 40. Those pointers are incremented only when the corresponding locations have been validly written to in a subsequent write phase.

Figure 16:
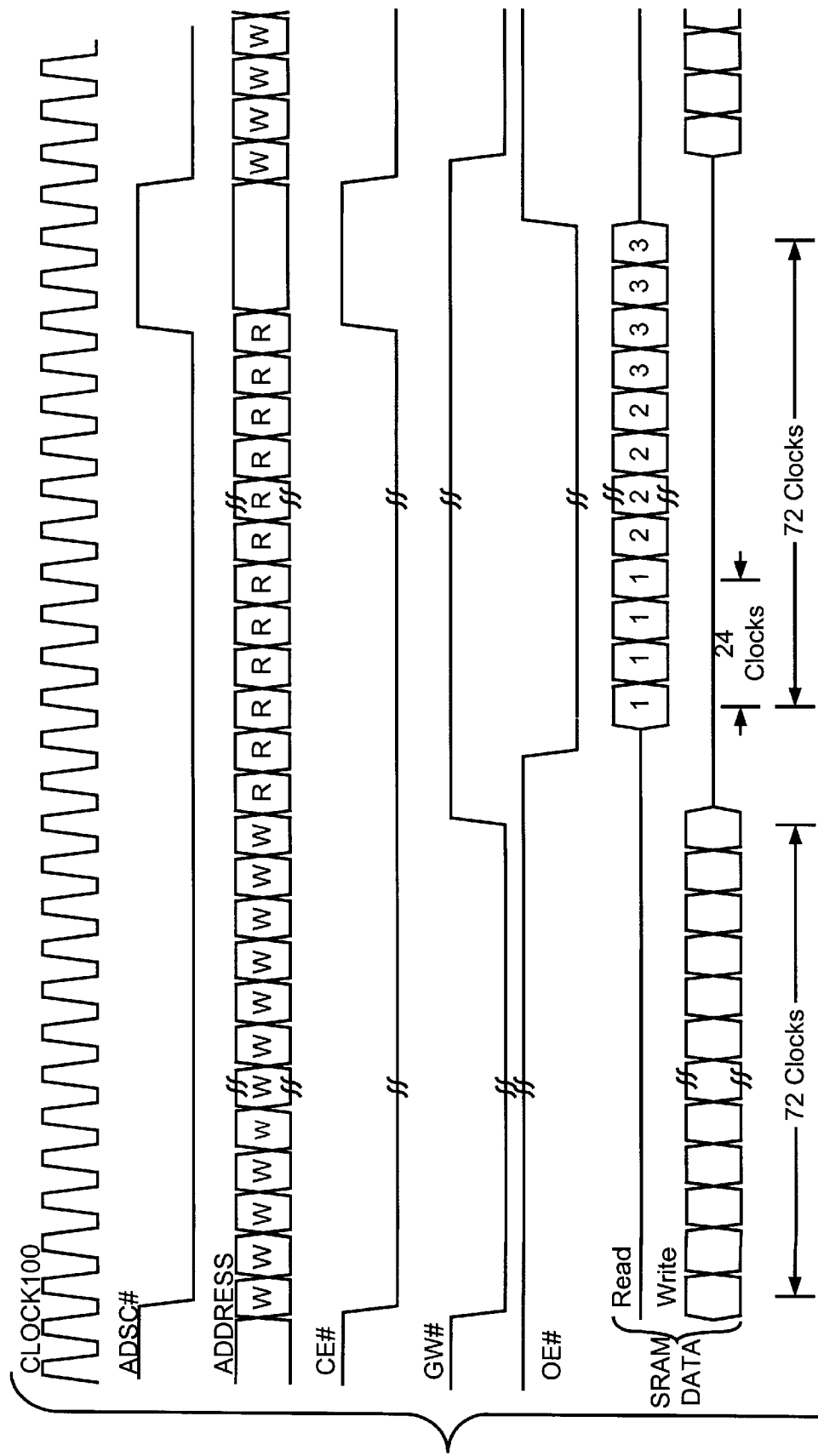
FIG. 16 is a timing diagram showing the timing of transmit buffer memory in the Gigabit Ethernet interface of FIG. 5.

FIG. 16 shows how a GEN 18' writes a Gigabit Ethernet frame into a TX buffer memory 24'. This process is like that shown in FIGS. 14 and 15 for the FEN 18, with the following differences. The write and read phases each have 72 cycles rather than 12. During each read phase, 24 8-byte words are read from each of the three port buffers 40'. During a write for a frame being forwarded on a single port, up to 72 words are written to the respective port buffer 40'. During a write for a frame being forwarded on more than one port, up to 24 words are written to each of the three port buffers 40'. If not all write cycles are needed for the respective frame during either type of write phase, the additional write cycles are used to begin writing a subsequent frame, if another frame is being forwarded from the fabric 12.

In the timing of FIG. 16, it is possible for the GEN 18' to write at a rate faster than the words are transferred from the switch fabric 12. If necessary, some of the cycles in the write phase are not used, in order to slow the writing rate down to the transfer rate. When a cycle is not used, the pointer for the corresponding port buffer 40' is not incremented during the write phase.

Figure 17:
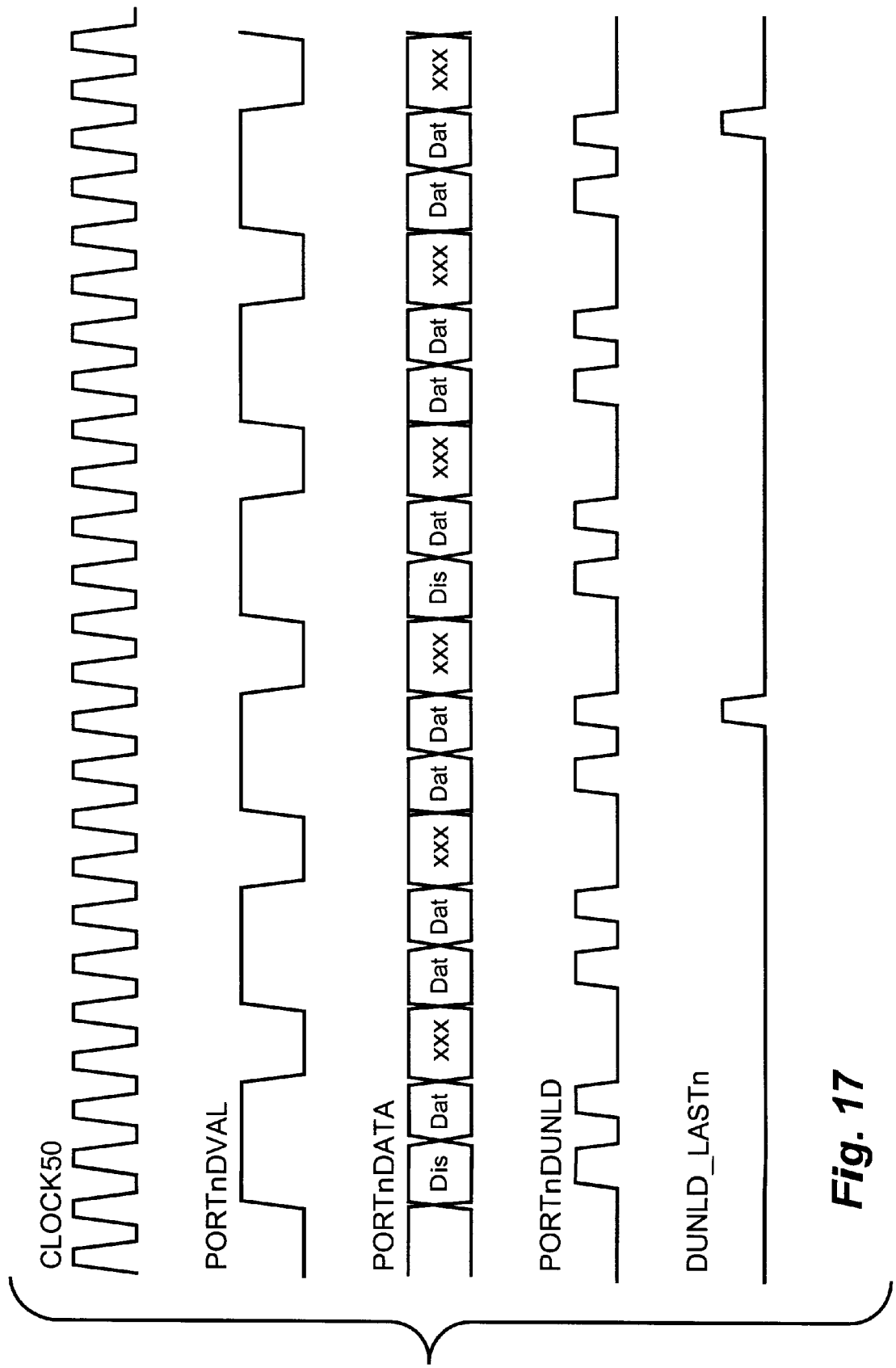
FIG. 17 is a timing diagram showing the timing of data transfers between transmit logic and an Ethernet media access controller (MAC) in the network interfaces of FIGS. 2 and 5.

FIG. 17 shows a timing diagram of data and control signals at the interface between the TX logic 34 and each of the MACs 36. The signal PORTnDATA represents the 32-bit data output to the MAC 36, which is the first 4-byte word in the 12 byte MAC buffer 62. The signal PORTnDVAL is asserted by the TX logic 34 to indicate that the data output to the corresponding MAC 36 is valid, i.e. that the first word in the MAC buffer 62 has been loaded from a port buffer 40 with valid frame data. The signal PORTnDUNLD is asserted by the MAC 36 to indicate that the first 4-byte word has been read by the MAC 36. The TX logic 34 responds to PORTnDUNLD by advancing a read pointer in the MAC buffer 62 to the next word.

Figure 18:
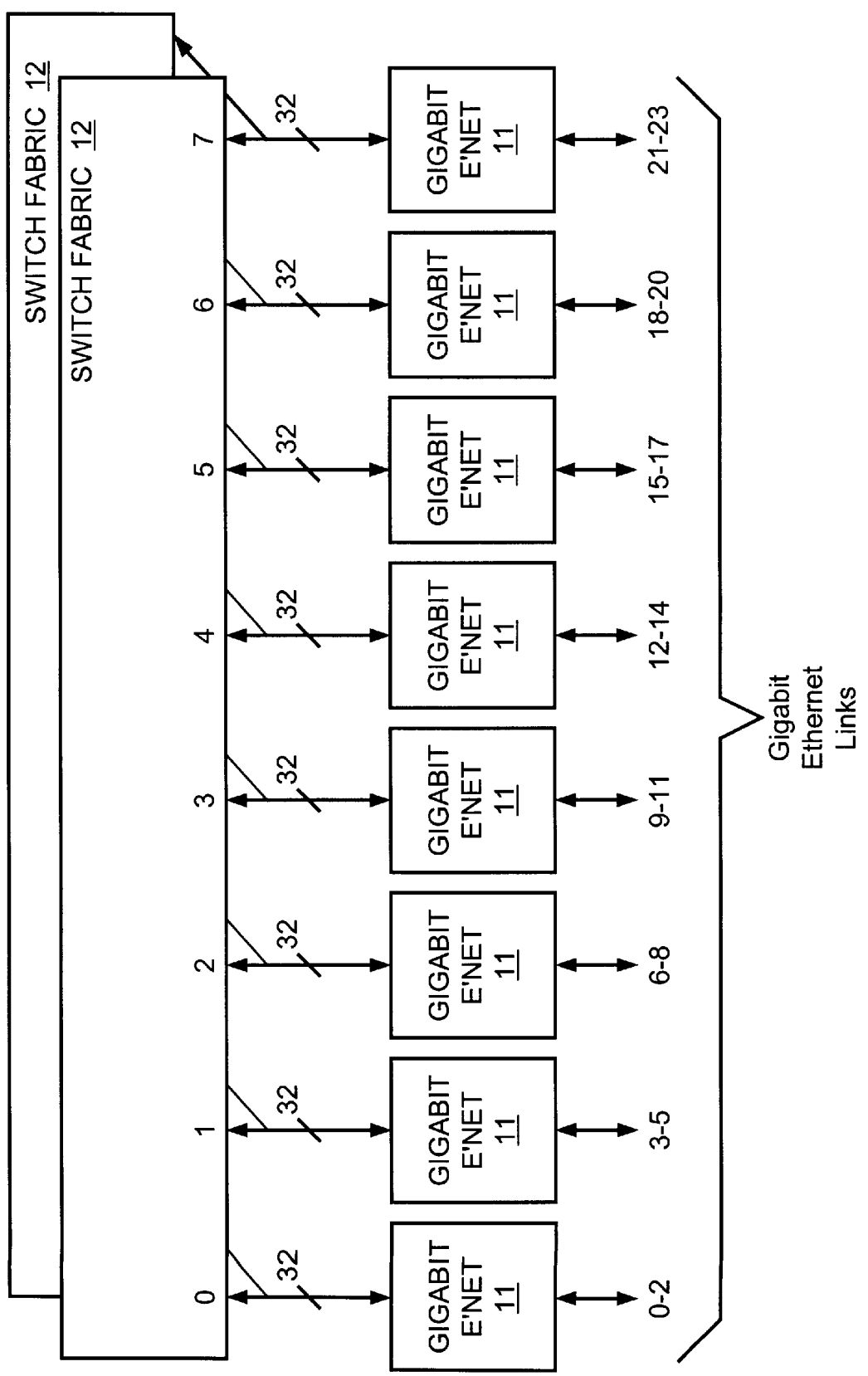
FIG. 18 is a block diagram of a second network switch including 24 Gigabit Ethernet ports.

FIG. 18 shows another embodiment of the present invention. A 24-port Gigabit Ethernet switch has two switch fabrics 12 and eight Gigabit network interfaces 11 as shown. Each interface 11 is connected to both switch fabrics 12 in the manner shown. The 32-bit buses shown represent the 32-bit input 14 and the 32-bit output 16 shown in FIG. 1. One half of each 32-bit bus is connected to one of the switch fabrics 12, and the other half to the other switch fabric 12. This configuration, referred to as "bit-sliced", is in contrast to the configuration of FIG. 1 in which the separate halves of the bus are connected to different ports on the same switch fabric. In the bit-slice configuration the switch fabrics 12 can make eight 32-bit connections among the eight interfaces 11. The bit-slice configuration requires that the descriptor be duplicated on each slice, so that the switch fabrics 12 receive the same Port Vector and therefore forward their respective slices of the frame to the same ports.

It will be apparent to those skilled in the art that modifications to and variations of the above-described methods and apparatus are possible without departing from the inventive concepts disclosed herein. Accordingly, the invention should be viewed as limited solely by the scope and spirit of the appended claims.

What is claimed is:

1. A method of operating a network switch having multiple ports each attached to a corresponding network link, comprising the steps of:

determining whether a data frame received from a network link and stored in a receive buffer on the switch is a unicast frame to be transmitted on only one network link or is a multicast frame to be transmitted on more than one network link;

transferring the frame from the receive buffer to an input data path of a set of transmit buffers used for temporary storage of data frames to be transmitted by the switch on network links attached thereto, each transmit buffer in the set being allocated for use with a corresponding network link attached to a corresponding different one of the switch ports, the set of transmit buffers having a periodic operating interval of predetermined duration defined as a write phase during which a portion of a data frame to be transmitted on one or more of the network links is to be written into one or more of the buffers;

if the frame is a unicast frame, writing the frame during the transfer thereof into the transmit buffer allocated for use with the network link on which the frame is to be transmitted, multi-word segments of the frame being written into the buffer during successive write phases, each segment being written during a corresponding one of the write phases as a burst of data words at a predetermined rate; and if the frame is a multicast frame, writing the frame during the transfer thereof into the transmit buffers allocated for use with the network links on which the frame is to be transmitted, words of the frame being written into the buffers during successive write phases, each word being written during a corresponding one of the write phases to all the buffers for the network links on which the frame is to be transmitted, the buffers to be written being sequentially selected during each write phase at substantially the predetermined rate.

2. A method according to claim 1, wherein the transferring step comprises the step carried out for a multicast frame of transferring the frame from the receive buffer to the input data path of the buffers at a rate substantially equal to one word per write phase.

3. A method according to claim 1, wherein the number of words in each segment is the same as the number of transmit buffers, and wherein the step of writing a multicast frame comprises the steps of:

sequentially selecting each of the transmit buffers during each write phase; and writing the data word into each transmit buffer upon the selection thereof if the frame is to be transmitted on the corresponding network link.

4. A method according to claim 1, wherein the set of transmit buffers has a second periodic operating interval of predetermined duration defined as a read phase during which a portion of a data frame to be transmitted on one or more of the network links is to be read from one or more of the buffers, and further comprising the step of reading words of the frame from the transmit buffers during successive read phases, each word being read during a corresponding one of the read phases from all the buffers for the network links on which the frame is to be transmitted, the buffers to be read being sequentially selected during each read phase at substantially the predetermined rate.

5. A method according to claim 1, wherein the step of reading the frame comprises the steps carried out for both unicast and multicast frames of:

sequentially selecting all of the transmit buffers during each read phase; and reading the data word from each buffer upon the selection thereof if the frame is to be transmitted on the corresponding network link.

6. A method for forwarding a frame comprising a plurality of words from a switch fabric to a transmit buffer comprising a plurality of port buffers within a network switch wherein each of said port buffers is associated with one port of said network switch, comprising the steps of:

determining whether said frame comprises a unicast frame or a multicast frame;

in the event said frame comprises a unicast frame, transmitting up to a predetermined number of successive words of said frame into a selected one of said port buffers of said transmit buffer within successive write cycles of a write phase, wherein the number of write cycles within said write phase equals said predetermined number and said predetermined number corresponds to the number of accessible port buffers;

in the event said frame comprises a multicast frame, for each word of the multicast frame, writing the respective word into respective ones of said plurality of port buffers designated within a port vector, wherein the number of write cycles within said write phase equals said predetermined number and said predetermined number corresponds to the number of accessible port buffers, and each write cycle of the write phase is allocated for the writing of the respective word to a unique one of said plurality of port buffers associated with the respective write cycle of said write phase.

7. A network switch, comprising:

a buffer memory operative to hold a set of transmit buffers to temporarily store data frames to be transmitted by the switch on network links attached thereto, each transmit buffer in the set being allocated for use with a corresponding network link attached to a corresponding different one of network ports on the switch, the set of transmit buffers having periodic operating intervals each including (i) a write phase of predetermined duration during which a portion of a data frame to be transmitted on one or more of the network links is written into one or more of the transmit buffers and (ii) a read phase of predetermined duration during which data words of a data frame to be transmitted on a corresponding one of the network links are read from each of the transmit buffers;

a first-in-first-out (FIFO) buffer having an input coupled to a switching fabric of the switch and an output coupled to a data bus of the buffer memory, the FIFO buffer being operative to receive frame data words from the switching fabric and to provide the received words to the buffer memory during the writing thereof;

network controller buffers each having an input coupled to the buffer memory data bus and an output coupled to a corresponding network interface controller, the network controller buffers being operative to receive frame data words from the buffer memory during the reading thereof and to provide the received data words to the network interface controllers for transmission of the frame on the corresponding network link; and address and control logic operative to determine (i) whether a data frame to be transferred from the switch fabric to the buffer memory is a unicast or multicast frame, and (ii) the destination network link or links on which the frame is to be transmitted, the address and control logic also being operative to control the transfer of data words among the switch fabric, the FIFO buffer, the buffer memory, and the network controller buffers such that (i) during the read phase of the buffer memory, one data word is read from each transmit buffer and loaded into the corresponding network controller buffer if the data word is part of a frame to be transmitted on the corresponding network link and the network controller buffer is not full, (ii) during the write phase of the buffer memory for a unicast frame, a multi-word segment of the frame is written to sequential locations of the transmit buffer allocated for use with the network link on which the frame is to be transmitted, and (iii) during the write phase for a multicast frame, a single word of the frame is written to one location in each of the transmit buffers allocated for use with the network links on which the frame is to be transmitted.

* * * * *

UNITED STATES PATENT AND TRADEMARK OFFICE
CERTIFICATE OF CORRECTION

PATENT NO.     : 6,226,292 B1                                              Page 1 of 1
DATED          : May 1, 2001
INVENTOR(S)    : Bruno DiPlacido It is certified that error appears in the above-identified patent and that said Letters Patent is hereby corrected as shown below:

<u>Column 6,</u>
Line 9, "ports 10" should read -- ports --.

Signed and Sealed this

Seventh Day of May, 2002

Attest:

JAMES E. ROGAN
*Attesting Officer*  *Director of the United States Patent and Trademark Office*